(12) United States Patent
Njah

(10) Patent No.: US 11,691,767 B1
(45) Date of Patent: Jul. 4, 2023

(54) ROCKET BOOSTER STAGE LANDING APPARATUS

(71) Applicant: Mounir Njah, Blaine, MN (US)

(72) Inventor: Mounir Njah, Blaine, MN (US)

( * ) Notice: Subject to any disclaimer, the term of this patent is extended or adjusted under 35 U.S.C. 154(b) by 154 days.

(21) Appl. No.: 17/689,465

(22) Filed: Mar. 8, 2022

(51) Int. Cl.
*B64G 1/62* (2006.01)
*B64G 5/00* (2006.01)

(52) U.S. Cl.
CPC ............ *B64G 1/62* (2013.01); *B64G 5/00* (2013.01)

(58) Field of Classification Search
CPC .................................. B64G 1/62; B64G 5/00
See application file for complete search history.

(56) References Cited

U.S. PATENT DOCUMENTS

| | | | |
|---|---|---|---|
| 11,292,620 B1 * | 4/2022 | Molony | B64G 1/52 |
| 2018/0162553 A1 * | 6/2018 | Powers | B64G 1/002 |
| 2022/0258883 A1 * | 8/2022 | Im | B64G 5/00 |

FOREIGN PATENT DOCUMENTS

WO    WO-2019021036 A1 *   1/2019

* cited by examiner

*Primary Examiner* — Tien Q Dinh
*Assistant Examiner* — William L Gmoser
(74) *Attorney, Agent, or Firm* — Berggren Law Offices, LLC

(57) ABSTRACT

A rocket booster stage landing apparatus for more reliably landing a returning booster stage for reuse in propelling and launching subsequent main rockets.

17 Claims, 9 Drawing Sheets

ROCKET BOOSTER STAGE LANDING APPARATUS

FIELD OF THE INVENTION

This invention relates to the recovery of rocket booster first stage for reuse in subsequent rockets.

BACKGROUND OF THE INVENTION

Rockets for delivering large payloads into space require a booster stage packed with fuel to lift the entire rocket to a desired altitude before disengaging from the main rocket with payload that continues on a specified path. The booster stage then falls to earth and may be retrieved in the ocean as salvage. To reduce costs, rocket booster stages are being designed to return to earth in a controlled manner to be reused.

Reuse requires different procedures depending on the weight of the main rocket. Rockets with booster stages follow a curved path into the upper atmosphere. When the booster stage is disconnected from the main rocket, recovery may occur at the original land lift of site or on a floating platform pulled by a ship at ocean. For smaller main rockets, enough fuel remains in the booster stage after disconnection to reverse the first stage and direct it back to its launch site within an appropriate diameter target area. For larger main rockets, not enough fuel remains, and the returning rocket booster stage must be guided along the shortest path to a platform over water with floating platform with an appropriate target pulled by a ship to a desired location for the returning stage. Care must be taken to have the returning booster stages land vertically and remain vertical until stationary with no further emissions of hot gases from ignited fuel. Currently, SpaceX is estimating with their Falcon 9 booster stages will make 70% of their landings on ground and 30% of their landings on a floating platform at ocean.

There is a need for a rocket booster stage retrieval apparatus that is based on the ground or on the floating platform that is configured to better guide the rocket booster stage into a safe vertical landing.

SUMMARY OF THE INVENTION

I have invented a rocket booster stage landing apparatus that is configured to improve safe retrieval of booster stages for reuse. Because the invention is a stand-alone apparatus, it does not add weight to the rocket by incorporating landing elements into the landing booster stage.

Specifically, the rocket booster stage landing apparatus comprises four elements, a platform, a dampening cushioning device, an exhaust diffuser device, and a truncated hollow cone. The platform comprises an area, a perimeter, a top, a bottom, and a center. The dampening cushioning device comprises a base attached to the of the platform, a dampening region above the bottom region of the base, and a protruding top with a base element attached to the dampening region and configured to participate in diffusing ignited fuel away from the dampening cushioning device and the landing site of the landing booster stage and avoid having the hot gas blowing back to the landing rocket booster stage. The exhaust diffuser device comprises a base with a first diameter, a first inside surface, and a first edge in communication with the platform to form multiple openings configured to direct hot gases from ignited fuel from the landing rocket booster stage away from the dampening cushioning device on the platform, the landing site of the landing booster stage, and avoid having the hot gas blowing back to the landing rocket booster stage, a mid-region with a second inside surface and a second diameter attached to the dampening cushioning device and the second inside surface, and an upper section with a third diameter, a third inside surface, and a third edge configured to releasably attach to a base of a landing rocket booster stage, the exhaust diffuser device having, a truncated cone shape with an outer surface and the first diameter is larger than the second diameter that is larger than the third diameter. The truncated hollow cone comprises an outer surface, an inner surface, an upper end having an upper opening with a fourth edge with a fourth circumference and an appropriate fourth diameter to permit access of the landing rocket booster stage, a lower region with a fifth diameter less than the fourth diameter and configured to expose the third edge of the exhaust diffuser device and a flared bottom with a sixth diameter and an inside surface between the fifth diameter and the sixth diameter that is configured to enclose and be in communication with the outer surface of the exhaust diffuser device to direct ignited fuel to the diffuser top and outward away from the dampening cushioning device and avoid having the hot gas blowing back to the landing rocket booster stage.

A method of using a rocket booster stage landing apparatus to retrieve a landing booster stage sufficiently cleanly to reuse the landing booster stage with minimal refurbishments comprises six steps. One step is providing a rocket booster stage landing apparatus comprising four elements that have been discussed above. Another step is positioning the rocket booster stage landing apparatus over a pre-determined area consisting of either stationary land or a floating platform over water that is going to be used as a target. Still another step is providing a landing booster stage descending over a pre-determined target on earth after decoupling from a main rocket. Another step is refining the position of the rocket booster stage landing apparatus in relation to the overhead descending rocket booster stage to receive the landing booster stage. Still another step is retrieving the rocket booster stage intact to form a retrieved rocket booster stage.

My invention provides a way to transport larger payloads into space in a more economical manner. The apparatus provides a dampening cushioning device to dampen the shock of landing on a firm surface. It also provides more massive and stable structure to maintain a more stable vertical orientation during landing. Further, it provides outlets to rapidly remove and reduce destructive heating of rocket stage exhaust during landing. My invention reduces weight on the rocket booster stage by removing the built-in landing system such as the four landing legs in the current Falcon 9 booster stage. It also reduces the amount of fuel needed for existing payloads or allows for larger payloads. In addition, not incorporating the landing system reduces rocket costs and allowing for reuse of the booster stage reduces rocket costs. All of these benefits result in a greater chance of safe landing of a booster stage on land or on a floating platform on water that permits reuse of the booster stage with less expensive refurbishing operations.

BRIEF DESCRIPTION OF THE DRAWINGS

The invention will become more fully understood by the accompanying drawings, wherein like elements are represented by like reference characters, which are given by way of illustration only and thus are not limitative of the example embodiments herein.

Figure 1:
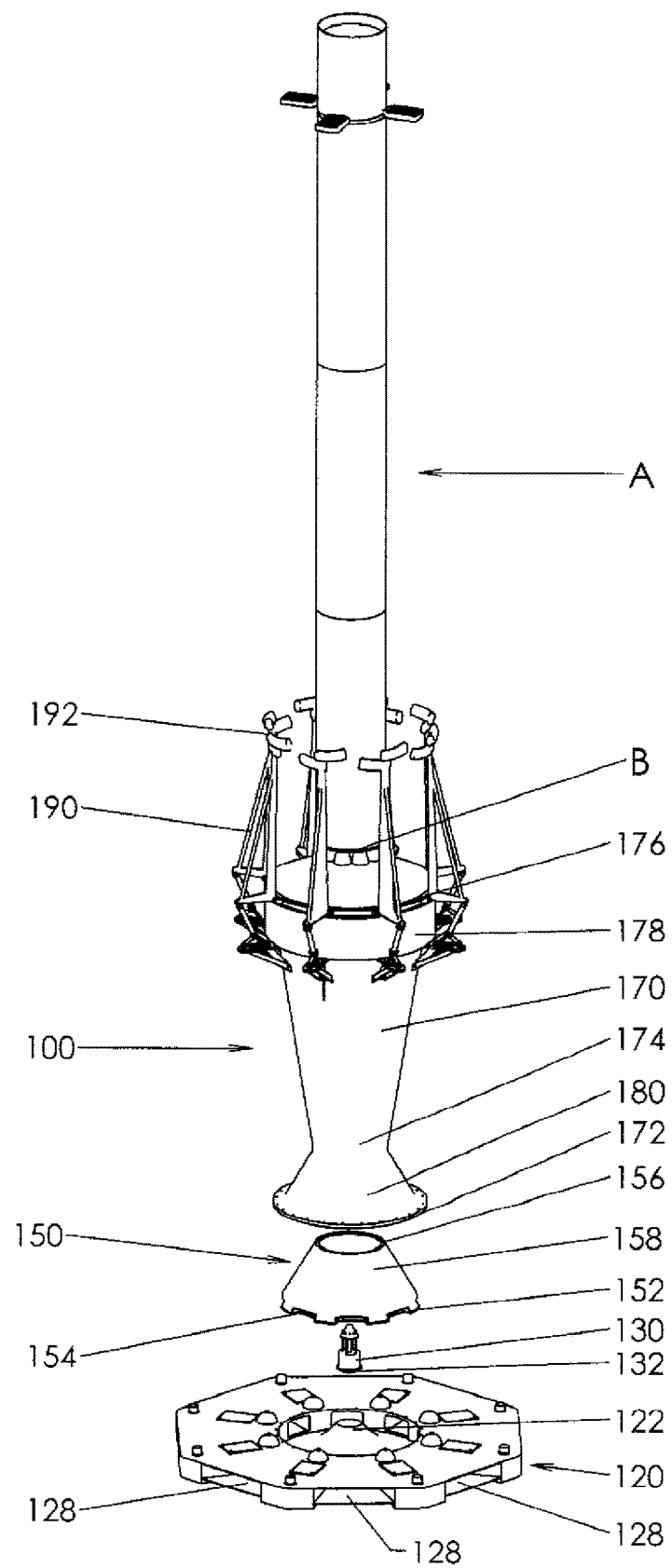
FIG. 1 is a perspective exploded view of an embodiment of the invention receiving a landing booster stage with partially closed grasping arms with separated ends that support the landing booster stage

While the invention is amenable to various modifications and alternative forms, specifics thereof have been shown by way of example in the drawings and will be described in detail below. It is to be understood, however, that the intention is not to limit the invention to the particular embodiments described. On the contrary, the invention is intended to cover all modifications, equivalents, and alternatives falling within the scope of the invention as defined by the appended claims.

DETAILED DESCRIPTION OF SOME EMBODIMENTS OF THE INVENTION

Many rocket booster stages are currently being deposited in the water and retrieved for salvage. There is a growing effort to retrieve the booster stages in a sufficiently undamaged state to be reused with minimal refurbishment operations to make space flight more economical. Some of these are platforms pulled by boats in the ocean that permit the booster stages to have a larger percentage of the fuel devoted to lifting larger payloads because less fuel is needed to just drop to the earth wherever they are and have a floating platform to be towed by a boat to be where the booster stage is landing. However, maintaining a vertical landing can be challenging as the ocean moves, the wind blows on side on the booster stage or both.

Some booster stages are being designed to land on an area that provides a hard stable surface. The landing site is generally either the takeoff site or a preselected land site. However, more fuel is required, and different challenges occur in maintaining a vertical orientation during landing. A higher percent of fuel is needed to land a booster on land, at a particular spot, such as, for example, liftoff, because fuel must be expended to guide the booster stage back to where lift off occurred or to another preselected site.

In both cases, additional concerns exist. One concern is the booster stage must be landed in a stable fashion to prevent it from tipping over and exploding. Another concern is the burning fuel exhaust must be safely dissipated away from the landing stage to prevent damage. Still another concern is cushioning the landing to minimize damage to the booster stage. Anything added to the booster stage to address these concerns adds weight that decreases the percent of the fuel that can be used to move the main rocket to its destination.

The invention addresses the challenges by providing a rocket booster stage landing apparatus separate from the booster stage. The apparatus allows for a focus on aspects needed to minimize booster stage damage during landing without increasing the percent of fuel required. Some elements may be quite heavy but minimize these problems and focus on maintaining safe booster stage landing for subsequent reuse. In addition, the apparatus of the invention is reusable with minimal refurbishing operations.

Specifically, the rocket booster stage landing apparatus comprises four elements, a platform, a dampening cushioning device, an exhaust diffusion device, and a truncated hollow cone.

The platform comprises an area, a perimeter, a top, a bottom, and a center. The area is large enough to offer a stable site for the rocket booster stage landing apparatus. A larger area may be beneficial when floating the apparatus than when positioning it on land.

In some embodiments, the platform comprises multiple channels to allow hot gases from ignited fuel from the landing booster stage to be displaced away from the booster stage.

In some embodiments, the platform comprises accumulators containing extinguishing agent used to cool the landing booster stage.

In some embodiments, the platform further comprises wheels configured to move the rocket booster stage landing apparatus within an area to be self-positioning to a descending overhead target of a ground platform or on a floating platform. The wheels are configured to better align the apparatus with the actual location where the landing booster stage is targeting. In some embodiments, the wheels are motor-driven and motor-positioned. The wheels may be similar to those on large aircraft. The wheels may be in pairs. In some embodiments, the wheels are directional. The wheels may be individually driven in both speed and direction of rotation to allow for more precise movement to a target area. In some embodiments the wheels are automatically or manually actuated and remotely driven and positioned using sensors or visually through a webcam to position the apparatus under the final position in space of the descending booster stage.

The dampening cushioning device is used to further decrease the speed of the landing booster to a stationary position stage to permit safe landing and minimize reconditioning before reuse of the booster stage. The dampening cushioning device comprises a base attached to the center of the platform, a dampening region above the bottom region of the base, and a protruding top with a base element attached to the dampening region and configured to participate in diffusing hot gases from ignited fuel away from the dampening cushioning device and the landing site of the landing booster stage and avoid having the hot gas blowing back to the landing booster stage.

In one embodiment, the base of the dampening cushioning device is attached to the platform, usually at its center to maximize horizontal stability of the rocket booster stage landing apparatus during use. The dampening region comprises a shell, a piston, and a dampening element. The shell attaches to the base and that encompasses the dampening elements and a horizontal piston element that rests on top of the dampening element. The piston further comprises upper vertical piston elements that extend from the top of the horizontal piston element and pass moveably through the top of the shell to attach to the base element of the protruding top. The piston also comprises a lower vertical element that extends from the bottom of the horizontal element, through the base of the shell attached to platform and moveably through the shell into the platform below the base. When weight is applied to the exhaust diffuser device, the upper and lower vertical piston elements pass through the shell pushing the horizontal piston element down against the dampening element to compress it against the bottom of the shell. The dampening element for the above dampening cushioning devise is a large area actuator. Other dampening cushioning devises may be used with other dampening elements such as the heavy metal springs and magnetic repelling systems but require dampening cushioning devices with different structure. The protruding top region has multiple nozzles configured to spray pressurized extinguishing agent into the bottom of the landing stage to extinguish any remaining ignited fuel and to remove the heat.

In another embodiment, the bottom of the upper region is in communication with to the upper end of a lower stabilizing truncated cone whose bottom end is affixed to the platform, and the base element of the protruding top is attached to the upper end of an upper stabilizing truncated cone whose bottom end is affixed to the base of the exhausting diffuser device for additional stability of the dampening cushioning device during landing.

The exhaust diffuser device comprises a base with a first diameter, a first inside surface, and a first edge in communication with the platform to form multiple openings configured to direct ignited fuel from the landing rocket booster stage away from the dampening cushioning device on the platform and the landing site of the landing booster stage and avoid having the hot gas blowing back to the landing rocket booster stage, a mid-region with a second inside surface and a second diameter attached to the dampening cushioning device and the second inside surface, and an upper section with a third diameter, a third inside surface, and a third edge configured to releasably attach to a base of a landing rocket booster stage, the exhaust diffuser device having, a truncated cone shape with an outer surface and the first diameter is larger than the second diameter that is larger than the third diameter. This is not easily accomplished with a landing booster stage that relies upon itself to provide all elements of achieving a stable vertical landing requiring minimal refurbishing operations before reuse in subsequent rocket launches.

The mid-region comprises attached to the base of the upper region of the dampening cushioning device multiple exhaust deflectors passing from the second inside surface of the exhaust diffuser device to bottom area of the protruding top region of the dampening cushioning device. Each deflector is angled down on both sides to direct exhaust down and outward to through multiple openings at the bottom of the exhaust diffuser device where it contacts the platform to exit channels on the platform. This region is where the landing booster stage bottom contacts the rocket booster stage landing apparatus.

The top opening with a third diameter is large enough to accommodate a landing booster stage.

In some embodiments, extinguishing agent is passed to the base of the landing booster stage to extinguish any remaining ignited fuel and to cool it off. Extinguishing agent, stored in accumulators. It is configured to pass from storage tanks or accumulators dispersed about the platform through flexible hoses to the base of the dampening cushioning device and up through the nozzles in the protruding top toward the landed booster stage bottom. Exhaust agent, now in the form of hot gases, is passed along the path of the leaving exhaust.

The extinguishing agent comprises materials that are stable and functional as extinguishing agents at temperatures experienced during exposure of burning rocket fuel and added to temperatures caused by friction with the atmosphere during booster stage landing. Suitable exhausting agents include, for example, at least one of liquid carbon dioxide or pressurized powder extinguishing agents that are stored typically under pressures of over 1000 psi.

The truncated hollow cone comprises an outer surface, an inner surface, an upper region, a lower region, and a flared bottom region. The upper region has an upper end having an upper opening with a fourth edge with a fourth circumference and an appropriate fourth diameter to permit easy access of the landing rocket booster stage. The lower region with a fifth diameter less than the fourth diameter and configured to expose the third edge of the exhaust diffuser device. This slope allows a landing booster stage that is slightly off course to be directed to the center of the platform. The truncated hollow cone also comprises a flared bottom region with a sixth diameter and an inside surface between the fifth diameter and the sixth diameter that is configured to enclose and be in communication with the outer surface of the exhaust diffuser device to direct hot gases from the ignited fuel to the diffuser top and outward away from the dampening cushioning device and the landing site of the landing booster stage and avoid having the hot gas blowing back to the landing rocket booster stage.

The truncated hollow cone is mounted on the platform and vertically to the dampening cushioning device on the platform. The first diameter is the diameter of a target area that the booster stage is configured to land within. The lower diameter is just larger than the diameter of the landing booster stage. The height, preferably above the center of gravity of the booster stage to minimize occurrence of toppling over of the booster stage. The height is below the full height of the booster stage to minimize weight that provides minimal further stability.

Appropriate dimensions depend upon the actual rocket booster stage that is being landed. A Falcon 9 rocket by SpaceX will be used in this document but the invention will benefit in a comparable manner other rockets with booster stages that are desired to be retrieved safely. The Falcon 9 is typically 63.3 meters (m) (207.8 feet (ft)) high, 3.7 m (12 ft) in diameter, and 549,000 kg (1,208,000 labs). Its nine first-stage Merlin engines generate 1.3 million pounds of thrust at sea level, rising to 1.5 million pounds of thrust as Falcon 9 climbs out of the Earth's atmosphere. The core itself of the first stage, called the booster stage that is being retrieved, is about 47.7 m (156.5 ft) high, and 3.7 m (12.0 ft) in diameter. The four landing legs, together, are about 23,000 kg (50,610 lbs). The rocket has a height of between just over half that of the booster stage and under the full height of the booster stage. Its nine engines Merlin 1D help it lift payloads into space and land the core safely on the ground. Together with a second stage, it is known as the Falcon 9 version 1.

For the above booster stage, an embodiment of the truncated hollow cone has a first diameter of approximately 8.5 m (28 ft). The landing booster stage passes from a speed of 20 mph or 29 fps at an altitude of 2000 ft to stationary on landing.

For some embodiments, the truncated hollow cone further comprises a collection of multiple arms with a first arm end rotatably attached equally distanced about the first circumference of the first end, a second arm end extending upward and outward from the first end, having curved horizontal tips, and configured to rotate inward to encompass a landing rocket booster stage without the adjacent tips touching each other.

For some embodiments, the truncated hollow cone of the previous embodiment further comprises a collection of multiple rod elements each extending horizontally from each second end to form a circular collection of rods about the landing booster stage with adjacent rods touching and tangling and configured to better stabilize the vertical orientation of the landing rocket booster stage. This embodiment offers increased vertical stability of the landed booster stage than the version where the adjacent second end do not touch.

In some embodiments, the truncated hollow cone further comprising at least one powered winding contacting the inner surface of the cone in an appropriate configuration configured to create a magnetic field within the cone capable of slowing down a descending booster stage. Magnetic fields place a drag upon the landing booster stage that increases with electrical power provided to the windings forming the magnetic fields. The magnetic field is only on for a few seconds as the landing booster stage passes through the magnetic field. This further increases the efforts of the dampening provided by the cushioning device mentioned above in the platform.

Materials used for the rocket booster stage landing apparatus vary as needed. In general, materials in contact with the landing booster stage should be strong enough to remain functional under the weight and temperatures involved during use. Those not in the presence of significant magnetic fields may use magnetically attracted materials such as, for example, carbon steel. Embodiments in the presence of strong magnetic fields may use non-magnetic materials such as, for example, stainless steel, titanium, and non-magnetic alloys of titanium. Use of materials with structures having composite materials such as fiber glass, fiber carbon, and a honeycomb construction offers significant reductions in weight without corresponding loses in strength.

FIGS. 1-9 further illustrate the nature of several embodiments of the invention. Similar elements have the same numbers.

FIG. 1 is a perspective exploded view of an embodiment of the invention receiving a landing booster stage with partially closed grasping arms with separated ends that support the landing booster stage. A landing booster stage (A) is shown with its bottom end region (B) entering an embodiment of the rocket booster stage landing apparatus (100) comprising a platform (120) with a center 122 and multiple exhaust channel, a dampening cushioning device 130 attached to platform 120 and an exhaust diffuser device (150) configured to be in communication with the platform 120 at the bottom edge (152) of exhaust diffuser device 150 with cutouts (154) forming tops of exhaust outlets. The truncated hollow cone (170) is shown with a bottom edge (172) narrowing in a lower section (174) before widening to a top edge (176). A magnetic field generator (178) is at the top of truncated hollow cone 170. The flared bottom (180) is configured to encompass in close contact an outer surface (158) of exhaust diffuser device 150. A collection of multiple arms (190) is rotatably attached to the upper part of truncated hollow cone 170. Arms 190 with small horizontal ends (192) are shown nearly closed around landing booster stage A.

Figure 2:
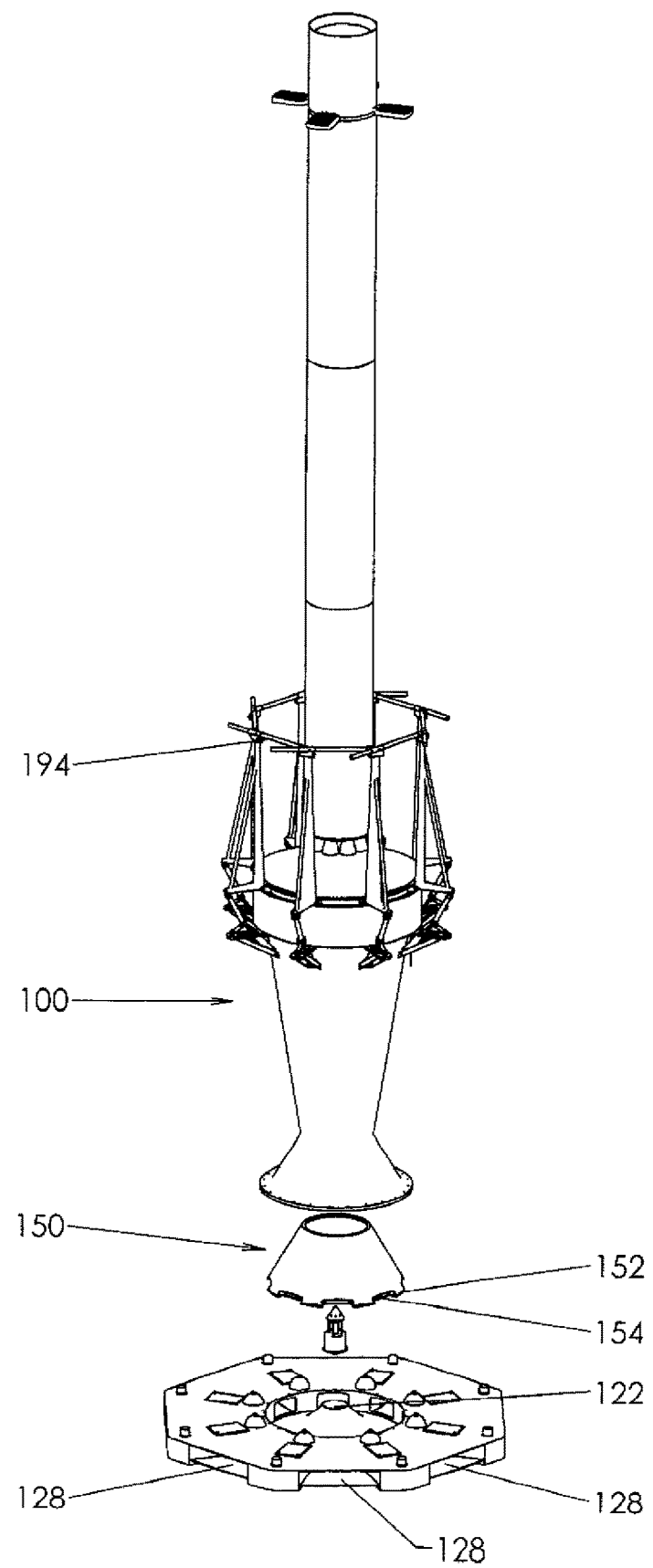
FIG. 2 is a perspective exploded view of an embodiment of the invention receiving a landing booster stage with partially closed connected grasping arms that encircle the landing booster stage.

FIG. 2 is a perspective exploded view of an embodiment of the outer invention receiving a landing booster stage with partially open connected grasping arms that encircle the landing booster stage. This embodiment is similar to that shown in FIG. 1 except small ends 192 are long rods (194) that are connected to each other when the arms are fully encircled around edge 176 booster stage bottom 176 of landed booster stage A.

Figure 3:
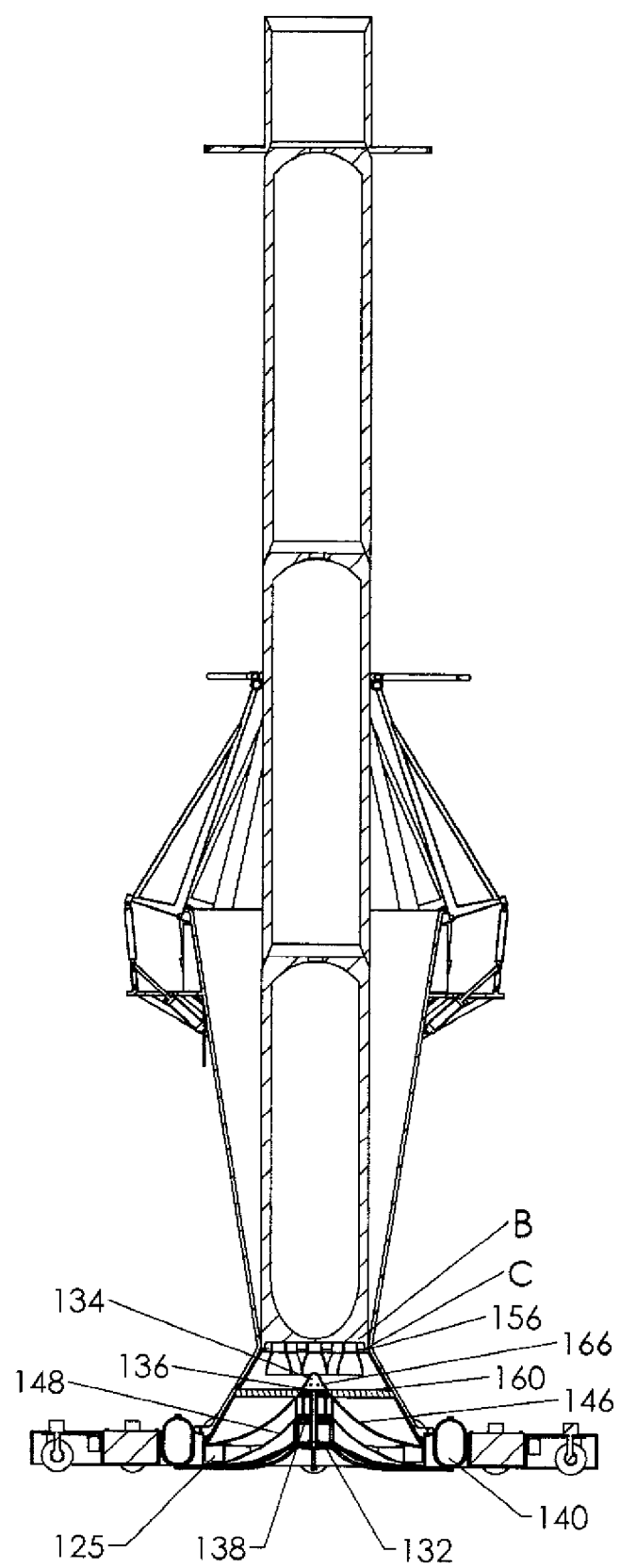
FIG. 3 is a cross section showing a collapsed side view of the embodiment shown in FIG. 2.

FIG. 3 is a collapsed side view of the embodiment shown in FIG. 2 with booster stage A landed. Booster stage end C of bottom B is shown resting on top end 156 of exhaust diffusing device 150. The base element (136) of protruding top (134) of dampening cushioning device 130 is attached to multiple angled deflector elements 160 (also shown in FIG. 4 and FIG. 6) of exhaust diffuser device 150 and had multiple holes (166) from which pressurized extinguishing agent is sprayed into the chamber formed by the inside surface (168) of exhaust diffuser 150 and the upper stabilizing truncated cone (146) attached to the dampening cushioning device at 146a (shown in FIG. 5) and the exhaust diffuser 150 (shown in FIG. 5) at 146b. Exhaust agent is moved from pressurized tanks or containers (140) toward inside of upper region 134 through holes 166. Then exhaust gases exit through channels (144) to openings (149) (together shown in FIG. 6) to openings (125) to channels 128 in platform (120) (together shown in FIG. 6).

Figure 4:
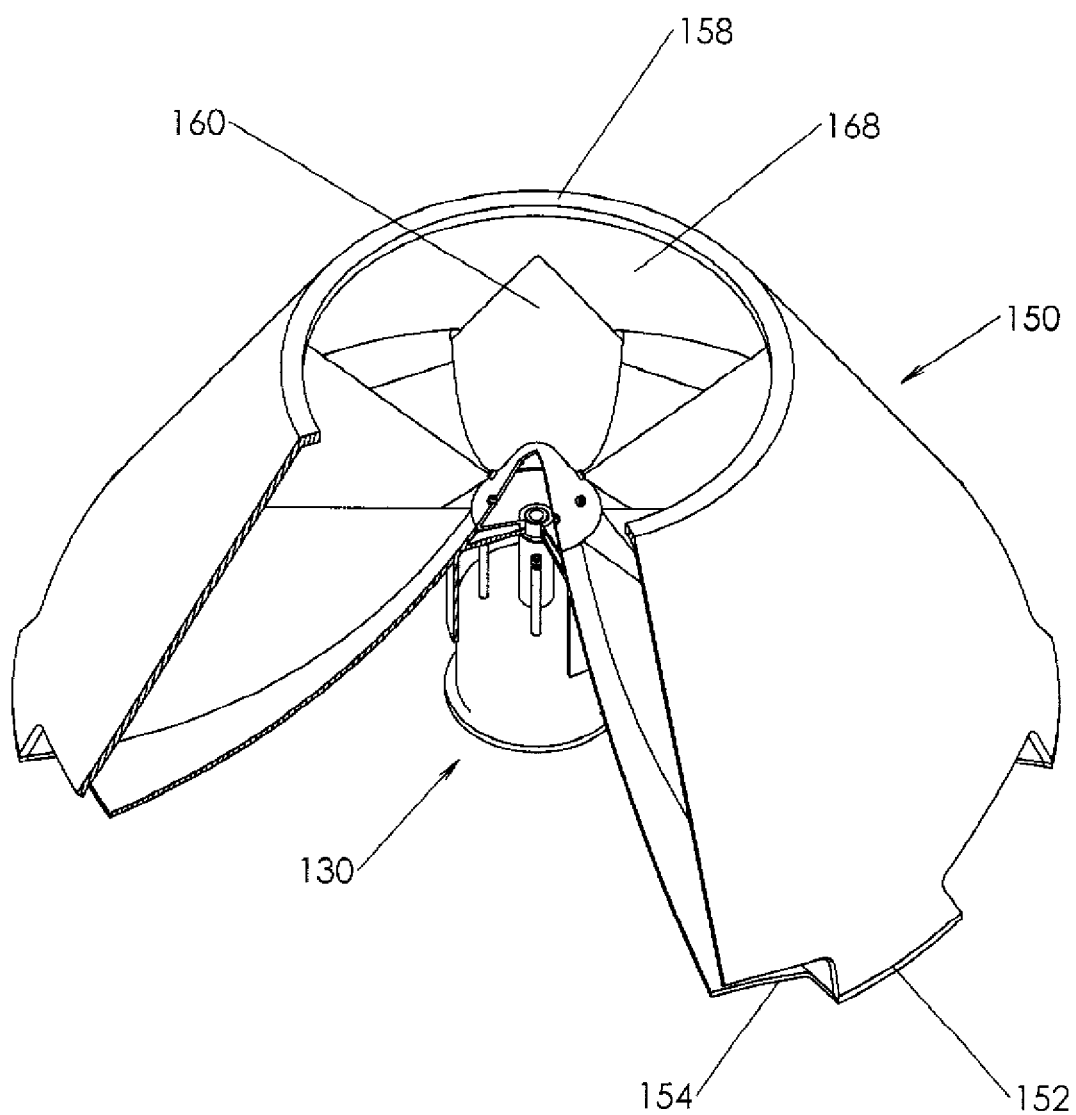
FIG. 4 is a perspective view with a cutout of the embodiment of FIG. 2 showing just the exhaust diffuser device connected to the dampening cushioning device and several exhaust deflection elements.

FIG. 4 is a perspective view with a cutout of the embodiment of FIG. 2 showing just the exhaust diffuser device connected to the dampening cushioning device and several angled exhaust deflection elements. Exhausting diffuser device 150 is shown cut away to show multiple angled deflector elements 160 attached to inside surface (168) of exhaust diffuser device 150 and to protruding top 134 of dampening cushioning device 130.

Figure 5:
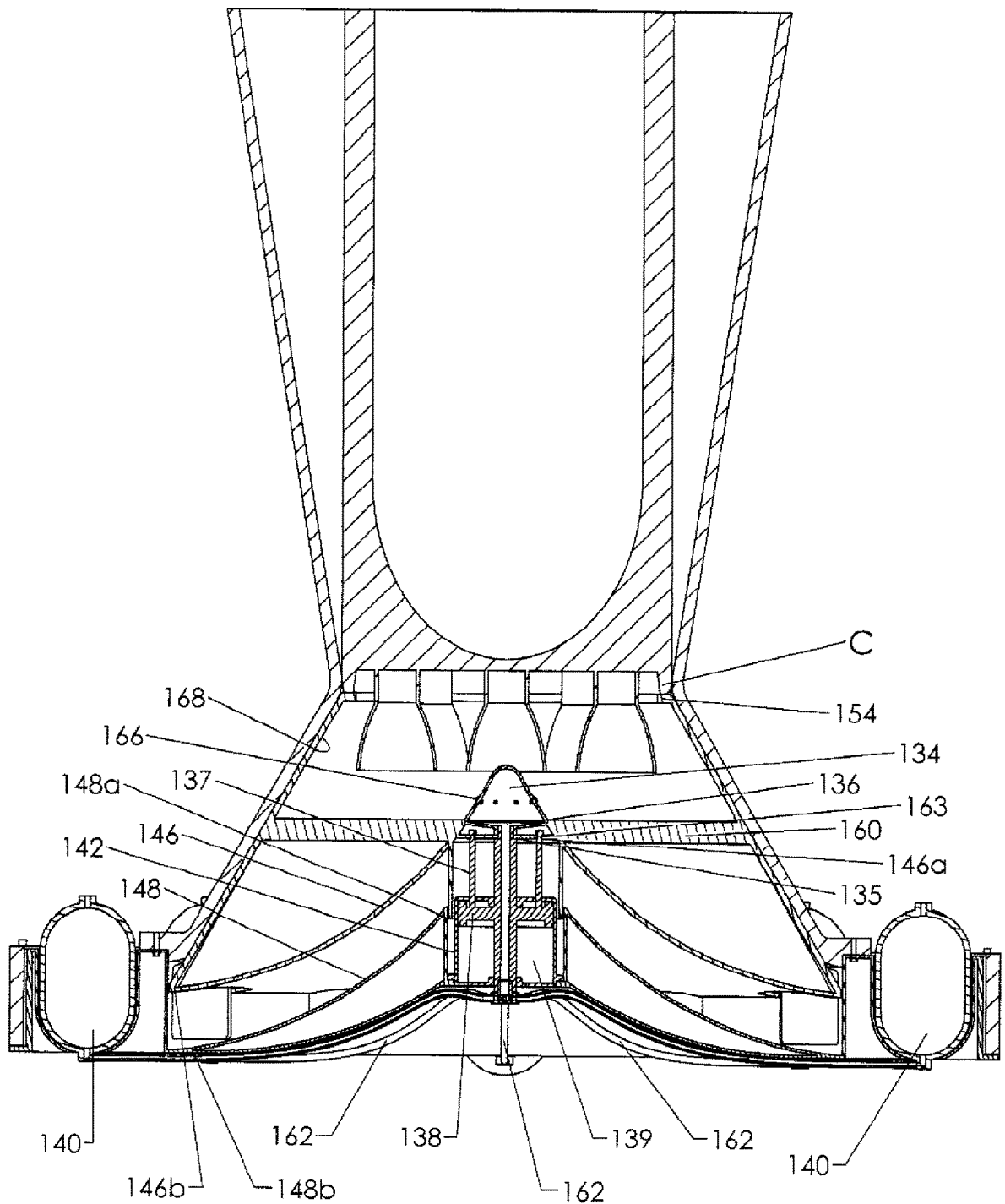
FIG. 5 is a larger view of a cross section of the lower part of the embodiment shown in FIG. 3 showing a dampening system and an extinction system that comprises pressurized accumulator and extinguishing agent delivery network.

FIG. 5 is a larger view of a cross section of the lower part of the embodiment shown in FIG. 3 showing a dampening system and an extinguishing system that comprises pressurized accumulator and extinguishing agent delivery network. Base element 136 of protruding top 134, circular element (163) of the mid-section of the exhaust diffuser 150, and horizontal piston element (138) are shown with top of dampening chamber (139) within shell (142) and upper region encompassing vertical piston elements (137). With upper ends (135). Stabilizing truncated cone 146 is attached to dampening cushioning device 130 at (146a) and exhaust diffuser device 150 at (146b). Lower stabilizing truncated cone (148) is in communication with dampening cushioning device 130 at (148a) and attached to platform 120 at (148b). Pressurized extinguishing agent accumulators 140 is shown with extinguishing agent configured to pass up through hoses (162) and then dampening cushioning device to protruding top 134 and through spray nozzles 166 into the underside of upper region of exhausting diffuser. Extinguished formerly ignited fuel then passes over multiple angled deflector elements 160.

Figure 6:
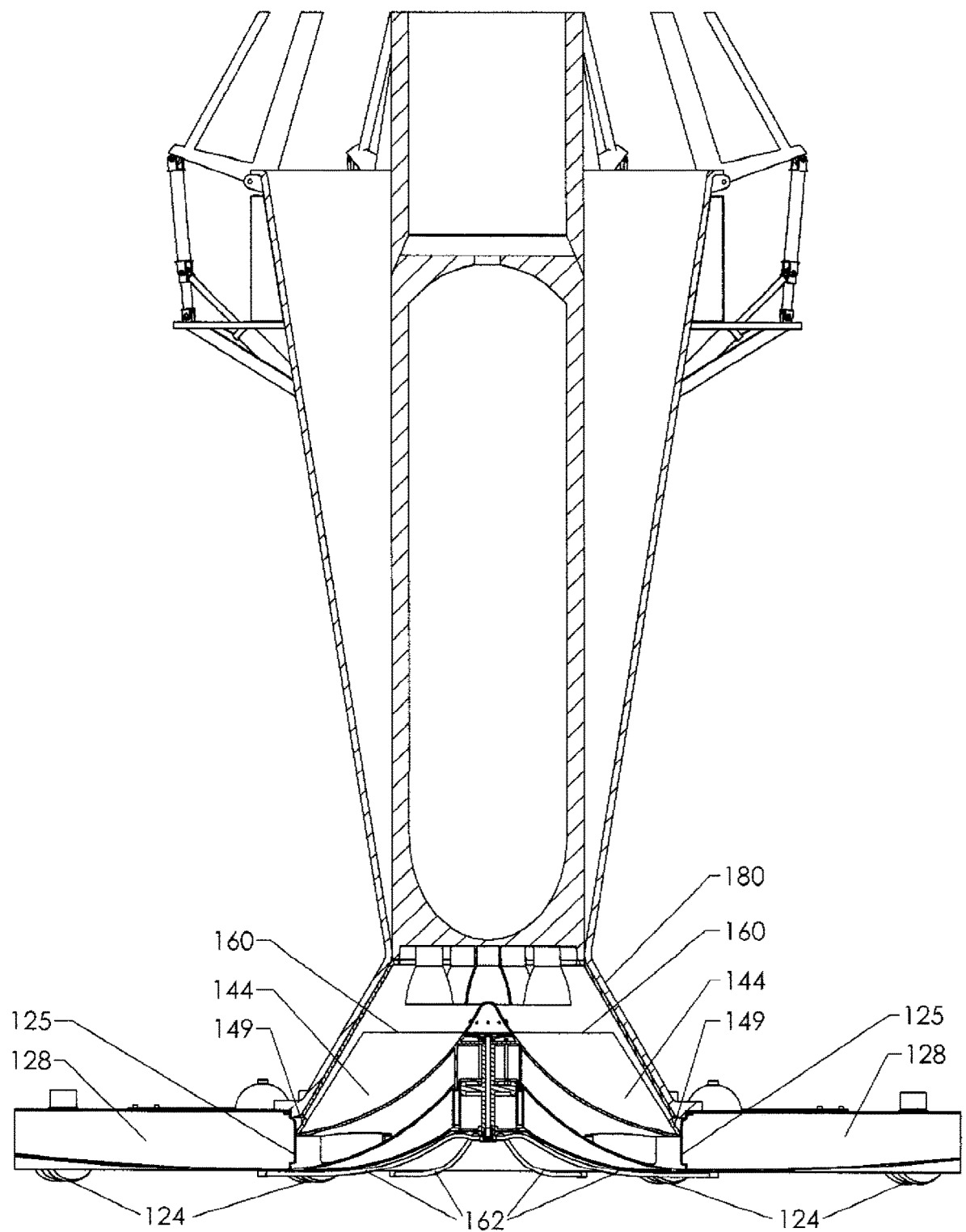
FIG. 6 is a cross-section of the invention shown in FIG. 3 with different angle showing the dampening cushioning device, and extinguishing spray nozzle with exhaust channels.

FIG. 6 is a cross-section of the invention shown in FIG. 3 with different angle showing the dampening cushioning device, and extinguishing spray nozzle 166 with exhaust channels 144. The extinguished formerly ignited fuel passes through opening 149 in the exhaust diffusing device 150 to openings 125 in the platform 120 to channels 128 in platform 120

Figure 7:
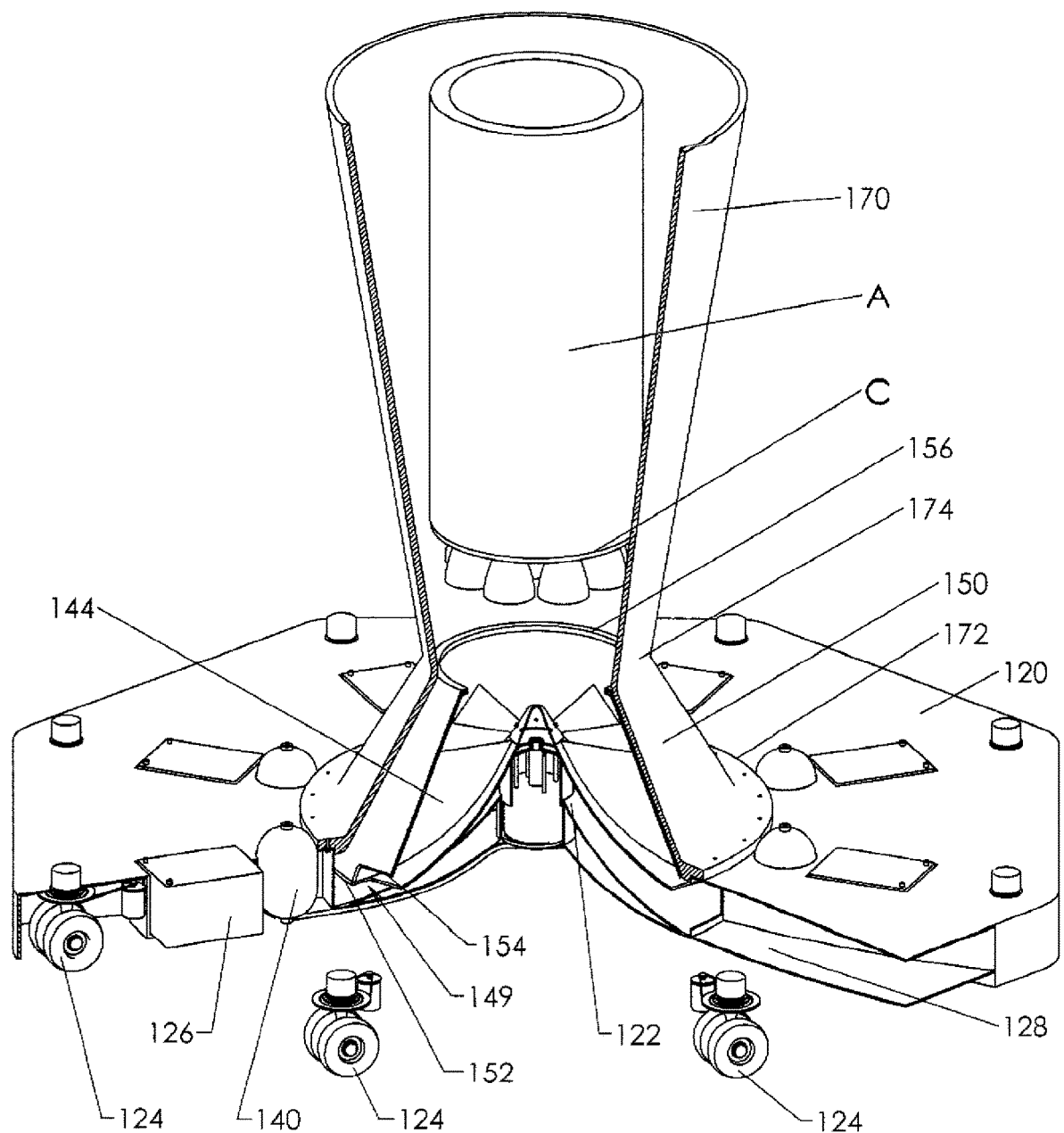
FIG. 7 is a perspective view of the bottom of the platform shown in FIG. 6 but of a larger area with cut-away showing sets of wheels, accumulators, batteries, the dampening cushioning device, and several angled exhaust deflector elements.

FIG. 7 is a perspective view of the bottom of the platform shown in FIG. 3 but of a larger area with cut-away showing sets of wheels, accumulator, batteries, inside of the dampening cushioning device, and several angled exhaustion deflector elements. Platform 120 is shown with exhaust diffuser device 150 over platform center 122 with edge 152 contacting platform and cutouts 154 over platform channels (128) configured to direct extinguished formerly ignited fuel away from booster stage A. Multiple angled deflector elements 160 as visible. Pairs of wheels (124) are shown each with their battery pack (126). Also shown are pressurized extinguishing agent accumulators 140 placed in platform 120.

A first method of using a rocket booster stage landing apparatus to retrieve a landing booster stage sufficiently cleanly to reuse the landing booster stage with minimal refurbishments comprises six steps. One step is providing a rocket booster stage landing apparatus comprising four elements that have been discussed above. Another step is positioning the rocket booster stage landing apparatus over a pre-determined area consisting of either stationary land or a floating platform over water that is going to be used as a target. Still another step is providing a landing booster stage descending to a pre-determined target area on earth containing the rocket booster stage landing apparatus after decoupling from a main rocket. Another step is refining the position of the rocket booster stage landing apparatus to be centered to the descending landing booster stage to receive the landing booster stage Refinement may be accomplished automatically or manually and by using sensors or visual means through a webcam. Still another step is retrieving the rocket booster stage intact to form a retrieved rocket booster stage. In some embodiments of the first method, the method of using a rocket booster stage landing apparatus comprises another step. The fifth step is reusing the retrieved rocket booster stage with minimal refurbishing operations.

In some embodiments of the first method, the method of using a rocket booster stage landing apparatus comprises another step. The fifth step is reusing the retrieved rocket booster stage with minimal refurbishing operations.

In some embodiments of the first method, the method uses an additional element in the booster stage landing apparatus and an additional step. The additional element is a collection of multiple arms with a first arm end rotatably attached equally distanced about the first circumference of the first end of the truncated hollow cone a second arm end extending upward and outward from the first end. Each second end may or may not have curved horizontal tips and is configured to rotate inward to encompass a landing rocket booster stage without the adjacent tips touching each other. The additional step is drawing the collection of multiple arms inward around the landing booster stage as it descends onto the rocket booster stage landing apparatus In some embodiments of the previous method, the method uses an additional element in the booster stage landing apparatus and an additional step. The additional element is collection of a multiple rod elements each extending horizontally from each second end to form a circular collection of rods about the landing booster stage with adjacent rods touching and configures to stabilize the vertical orientation of the landing rocket booster stag. The indrawn rods form a circular pattern having a diameter similar to the landed rocket booster stage to increase the ease of the returned booster stage remaining vertical and not falling over to become damaged. The additional step is drawing the collection of multiple rods inward, as the collection of arms are drawn inward, around the landing booster stage as it descends onto the rocket booster stage landing apparatus. This provides additional support for holding the booster stage stable than just using the arms alone as provided in the previous embodiment.

In some embodiments of the first method, the truncated hollow cone further comprises at least one powered winding contacting the inner surface of the cone in an appropriate configuration configured to create a magnetic field within the cone capable of slowing down a descending booster stage to reduce its descending speed still further without using more fuel.

In some embodiments of the first method, the platform further comprises multiple spray nozzles configured to deposit extinguishing agent onto the dampening cushioning device and base of a booster stage to the dampening cushioning device to reduce heat stress upon the landing apparatus and base of the landing booster stage.

In some embodiments of the first method, the platform further comprises wheels configured to move the rocket booster stage landing apparatus to be self-positioned to a descending overhead target area of ground or on a floating platform.

In some embodiments of the previous method, the wheels are from a group consisting of motor driven, directional, and manually remote driven.

Figure 8:
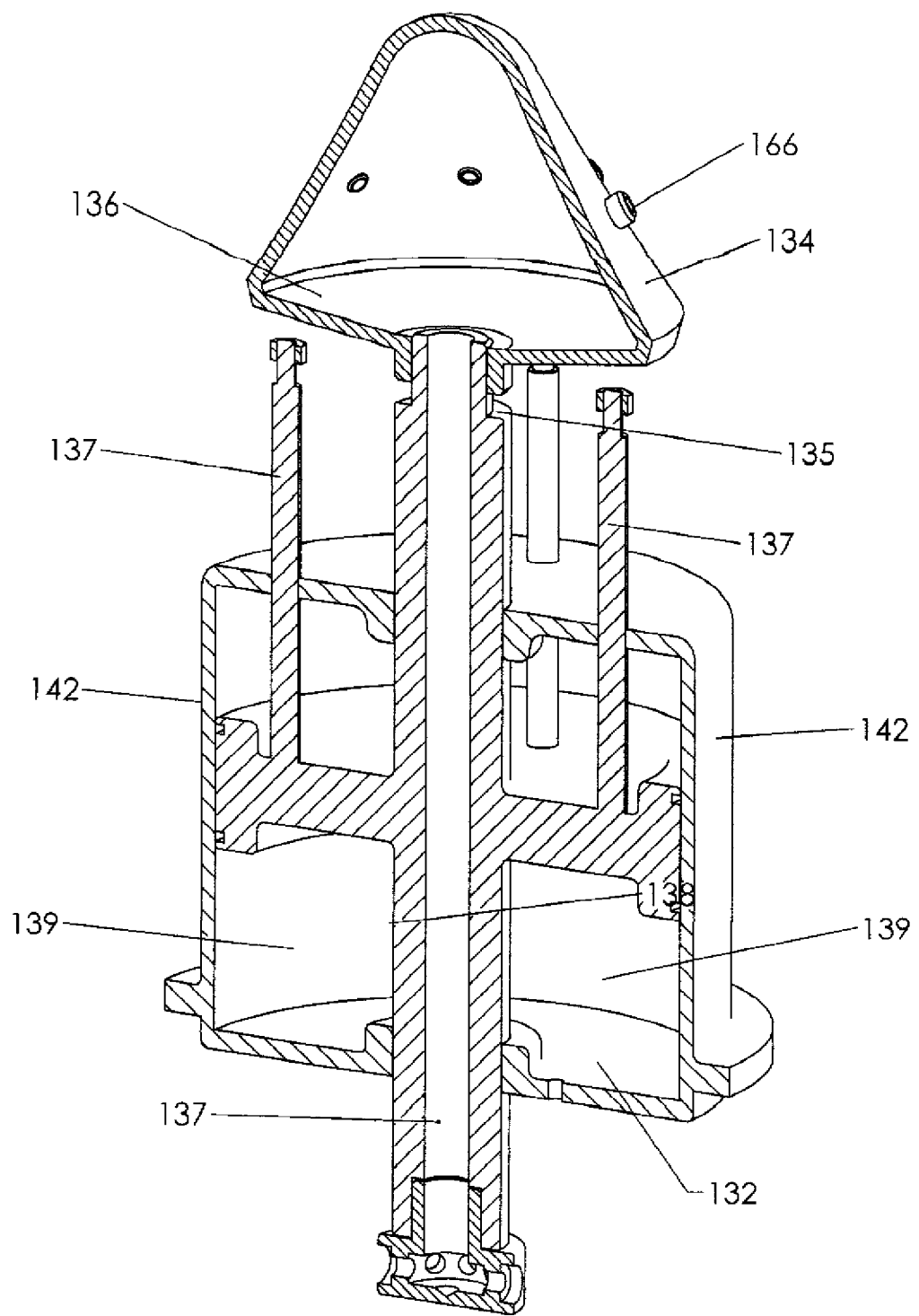
FIG. 8 is a cross-section of a perspective view of a dampening cushioning device shown in FIG. 5 but with the device half collapsed by the landing rocket booster stage.
Figure 9:
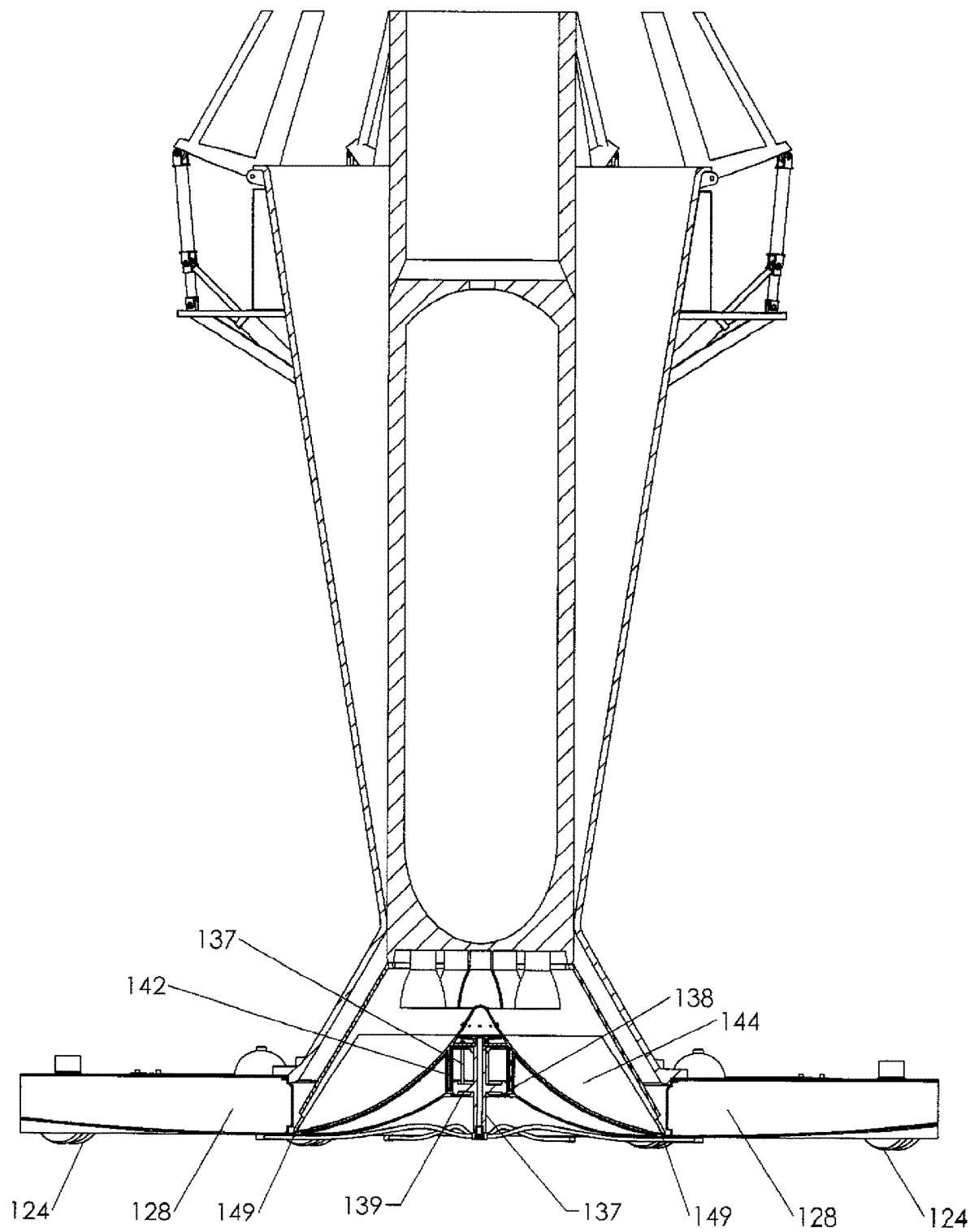
FIG. 9 is a cross-section of the invention shown in FIG. 7 but with the landing rocket booster stage landed.

FIGS. 8 and 9 further illustrate the interaction of the various parts during landing.

FIG. 8 is a cross-section of a perspective view of a dampening cushioning device shown in FIG. 5 but with the device half collapsed within its shell 142 by the landing rocket booster stage pushing on exhaust diffuser top (not shown) which causes mid-section 160 (not shown) attached base element 136 of protruding top 134 that is attached to the tops 135 of upper vertical piston elements 137. As vertical piston elements are pressed down, the horizontal piston element 138 pressed down on the top of the dampening elements 139 within dampening cushioning device shell 142 and pressed the lower vertical piston element into a cavity in the platform below base 132. In this view, the distance between horizontal piston element 138 of upper region and bottom region 132 of shell 142 is less as weight of landing booster stage is increasingly depresses the dampening elements 139.

FIG. 9 is a cross-section of the invention shown in FIG. 7 but with the landing booster stage landed. Note the minimal height of the dampening elements 139 and the extension of the lower vertical piston element below the base.

Other modifications and changes regarding my invention will be apparent to those skilled in the art. The invention is not limited to the embodiments chosen for purposes of disclosure and covers all changes and modifications that do not constitute departures from the true spirit and scope of this invention.

I claim:
1. A rocket booster stage landing apparatus for receiving a landing booster stage with a landing booster stage base on a landing site comprising
   a platform comprising an area, a perimeter, a top, a bottom, and a center,
   a dampening cushioning device comprises a base attached to the center of the platform, a dampening region above the base, and a protruding top with a base element attached to the dampening region and configured to participate in diffusing hot gas from ignited fuel away from the dampening cushioning device and the landing site of the landing booster stage and avoid having the hot gas blowing back to the landing rocket booster stage, an exhaust diffuser device comprising a base with a first diameter in communication with the platform to form multiple openings configured to direct hot gas from ignited fuel from the landing rocket booster stage away from the dampening cushioning device on the platform, a mid-region with a second inside surface and a second diameter attached to the dampening cushioning device and the second inside surface, and an upper section with a third diameter, a third inside surface, and a third edge configured to releasably attach to a base of a landing rocket booster stage, the exhaust diffuser device having, a truncated cone shape with an outer surface and the first diameter is larger than the second diameter that is larger than the third diameter; and a truncated hollow cone comprising an outer surface, an inner surface, an upper end having an upper opening with a fourth edge with a fourth circumference and an appropriate fourth diameter to permit access of the landing rocket booster stage, a lower region with a fifth diameter less than the fourth diameter and configured to expose the third edge of the exhaust diffuser device and a flared bottom with a sixth diameter and an inside surface between the fifth diameter and the sixth diameter that is configured to enclose and be in communication with the outer surface of the exhaust diffuser device to direct ignited fuel to the diffuser top and outward away from the dampening cushioning device and from the landing site of the landing booster stage to avoid blow back and damage to the landing booster stage.

2. The rocket booster stage landing apparatus of claim 1, wherein the truncated cone further comprises a collection of multiple arms with a first arm end rotatably attached equally distanced about the first circumference of the first end, a second arm end extending upward and outward from the first end, having curved horizontal tips, and configured to rotate inward to encompass a landing rocket booster stage without the adjacent tips touching each other.

3. The rocket booster stage landing apparatus of claim 2, wherein the truncated cone further comprises a collection of multiple rod elements each extending horizontally from each second end to form a circular collection of rods about the landing booster stage with adjacent rods touching and tangling and configures to stabilize the vertical orientation of the landing rocket booster stage.

4. The rocket booster stage landing apparatus of claim 1, wherein the truncated cone further comprising at least one powered magnetic field generator about the upper end of the truncated cone configured to slow down a landing rocket booster stage.

5. The rocket booster stage landing apparatus of claim 1, wherein the protruding top of the dampening cushioning device further comprises multiple nozzles configured to direct extinguishing agent toward and cool the landing booster stage.

6. The rocket booster stage landing apparatus of claim 5, wherein the extinguishing agent comprises at least one of liquid carbon dioxide or a pressurized powder extinguishing agent.

7. The rocket booster stage landing apparatus of claim 1, wherein the platform further comprises wheels configured to move the rocket booster stage landing apparatus to be properly positioned to receive a landing booster stage on land or on a floating platform.

8. The rocket booster stage landing apparatus of claim 7, wherein the wheels are motor driven.

9. The rocket booster stage landing apparatus of claim 7, wherein the wheels are directional.

10. The rocket booster stage landing apparatus of claim 7, wherein the wheels are manually activated and remotely driven.

11. A method of using a rocket booster stage landing apparatus for receiving a landing booster with a base comprising providing a rocket booster stage landing apparatus comprising a platform comprising an area, a perimeter, a top, a bottom, and a center;

a dampening cushioning device comprises a base attached to the hollow center of the platform, a dampening region above the base, and a protruding top with a base element attached to the dampening region and configured to participate in diffusing hot gas from the ignited fuel away from the dampening cushioning device and the landing site of the landing booster stage and avoid having the hot gas blowing back to the landing rocket booster stage;

an exhaust diffuser device comprising a base with a first diameter in communication with the platform to form multiple openings configured to direct hot gas from the ignited fuel from the landing rocket booster stage away from the dampening cushioning device on the platform and the landing booster stage, a mid-region with a second inside surface and a second diameter attached to the dampening cushioning device and the second inside surface, and an upper section with a third diameter, a third inside surface, and a third edge configured to releasably attach to a base of a landing rocket booster stage, the exhaust diffuser device having, a truncated cone shape with an outer surface and the first diameter is larger than the second diameter that is larger than the third diameter; and a truncated hollow cone comprising an outer surface, an inner surface, an upper end having an upper opening with a fourth edge with a fourth circumference and an appropriate fourth diameter to permit access of the landing rocket booster stage, a lower region with a fifth diameter less than the fourth diameter and configured to expose the third edge of the exhaust diffuser device and a flared bottom with a sixth diameter and an inside surface between the fifth diameter and the sixth diameter that is configured to enclose and be in communication with the outer surface of the exhaust diffuser device to direct hot gas from ignited fuel to the diffuser top and outward away from the dampening cushioning device and from the landing site of the landing booster stage to avoid blowing back and damaging the landing booster stage;

positioning the rocket booster stage landing apparatus over a pre-determined area consisting of either stationary land or a floating platform over water that is going to be used as a target;

providing a landing booster stage descending to a pre-determined target area on earth containing the rocket booster stage landing apparatus after decoupling from a main rocket;

refining the position of the rocket booster stage landing apparatus to be centered to the descending landing booster stage to receive the landing booster stage; and retrieving the rocket booster stage intact to form a retrieved rocket booster stage.

12. The method of using a rocket booster stage landing apparatus of claim 11 further comprising the step of reusing the retrieved rocket booster stage with minimal refurbishing operations.

13. The method of using a rocket booster stage landing apparatus of claim 11, wherein the truncated cone further comprises a collection of multiple arms with a first arm end rotatably attached equally distanced about the first circumference of the first end, a second arm end extending upward and outward from the first end, having curved horizontal tips, and configured to rotate inward to encompass a landing rocket booster stage without the adjacent tips touching each other and a collection of multiple rod elements each extending horizontally from each second end to form a circular collection of rods about the landing booster stage with adjacent rods touching and tangling and configures to stabilize the vertical orientation of the landing rocket booster stage, and the method further comprises the step of drawing the collection of multiple arm and rods inward around the landing booster stage as it descends onto the rocket booster stage landing apparatus.

14. The method of using a rocket booster stage landing apparatus of claim 11, wherein the truncated cone further comprises at least one powered magnetic field generator about the upper end of the truncated cone configured to slow down a landing booster stage to reduce its descending speed still further without using more fuel.

15. The method of using a rocket booster stage landing apparatus of claim 11, wherein the upper region of the dampening cushioning device further comprises multiple openings configured to direct extinguishing agent toward the landing booster stage to extinguish the remaining ignited fuel and to cool it.

16. The method of using a rocket booster stage landing apparatus of claim 11, wherein the platform further comprises wheels configured to move the rocket booster stage landing apparatus to where a descending overhead booster stage is landing on ground or on a floating platform.

17. The method of using a rocket booster stage landing apparatus of claim 16, wherein the wheels are from a group consisting of motor driven, directional, and manually remote driven.

* * * * *